Figure 1:
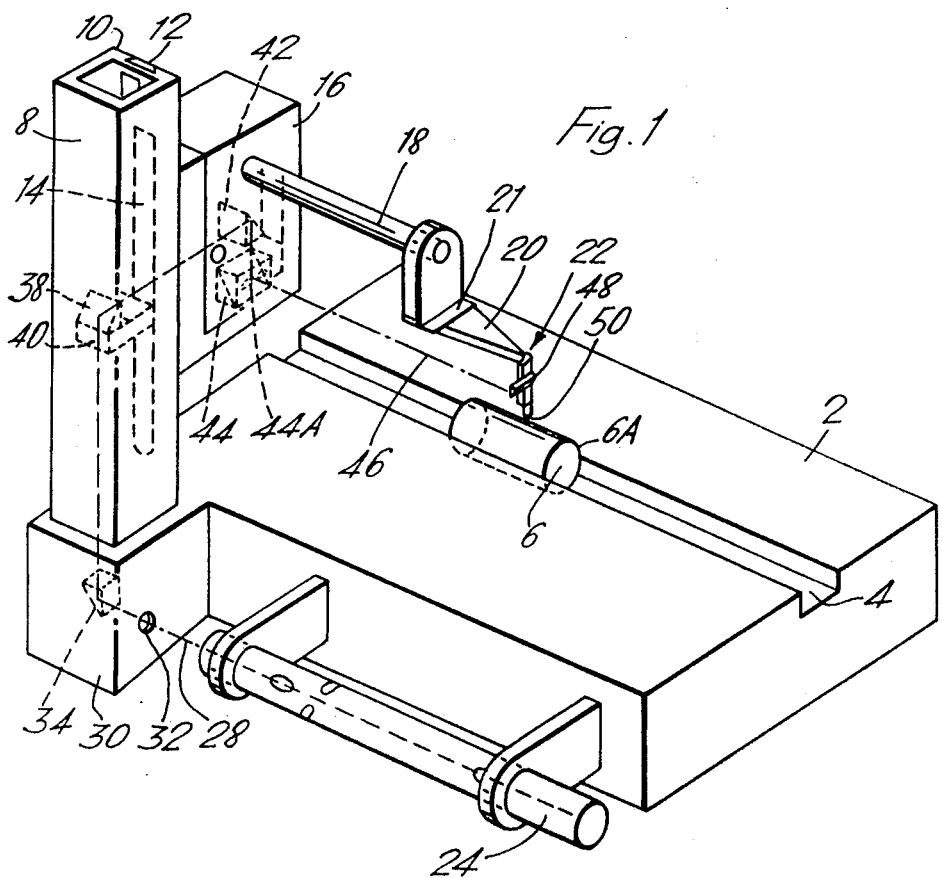

United States Patent

[11] 3,596,362

| [72] | Inventor | Richard Edmund Reason<br>Market Harborough, England |
|---|---|---|
| [21] | Appl. No. | 783,995 |
| [22] | Filed | Dec. 16, 1968 |
| [45] | Patented | Aug. 3, 1971 |
| [73] | Assignee | The Rand Organization Limited<br>London, England |
| [32] | Priority | Dec. 18, 1967 |
| [33] | | Great Britain |
| [31] | | 57387/67 |

[54] SURFACE MEASURING APPARATUS
23 Claims, 16 Drawing Figs.

[52] U.S. Cl. .................................................. 33/174,
33/46, 33/46.2, 33/174 L, 33/174 P
[51] Int. Cl. ....................................................... G01b 11/00,
G01b 15/00
[50] Field of Search............................................33/46, 46.2,
125 O, 174 L, 174 P, 172 E, Digest 3, 1 O, 1 T; 350/285, 286, 287

[56] References Cited
UNITED STATES PATENTS

| 2,703,456 | 3/1955 | Smyth ........................... | 33/174 P |
| 3,328,885 | 7/1967 | Frindel ......................... | 33/174 P |

*Primary Examiner*—Leonard Forman
*Assistant Examiner*—Paul G. Foldes
*Attorney*—Holcombe, Wetherill & Brisebois ABSTRACT: The profile of a surface is tested automatically by directing a parallel reference beam of light substantially parallel to the surface on to beam displacement means, such as a reflecting prism, carried by a surface-engaging stylus, so that a measuring beam is produced which is displaced relative to the reference beam by an amount proportional to the stylus movement. Detection means, for example a differential photoelectric sensor, are used to indicate change in said displacement and thereby provide an indication of the surface profile.

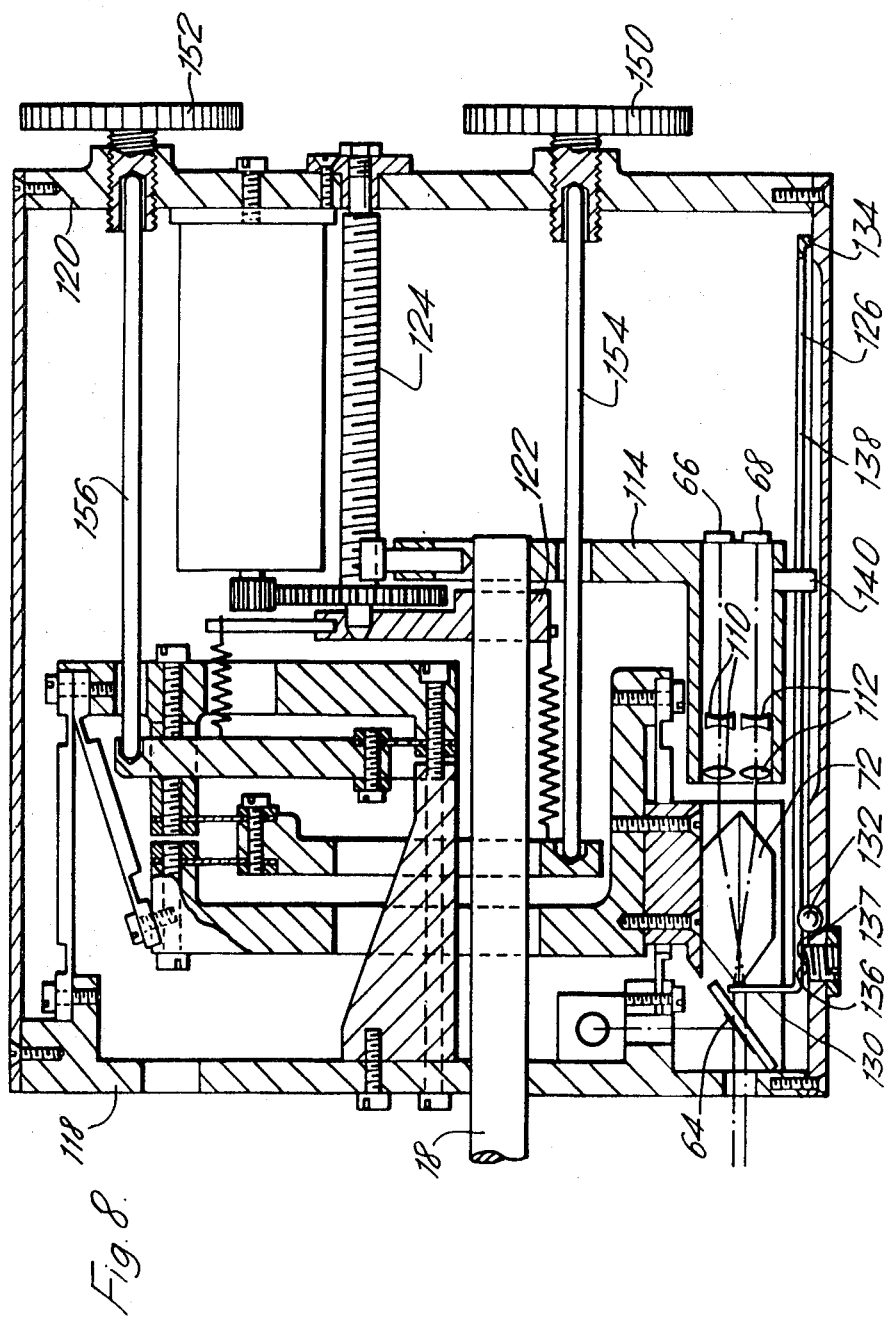

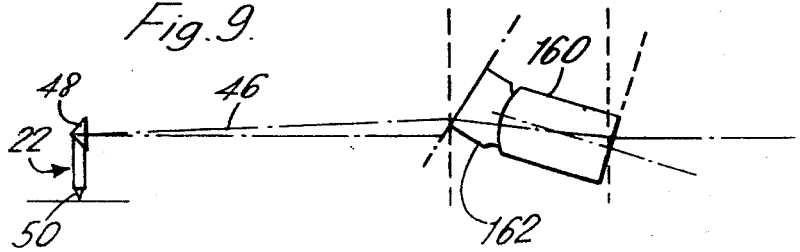
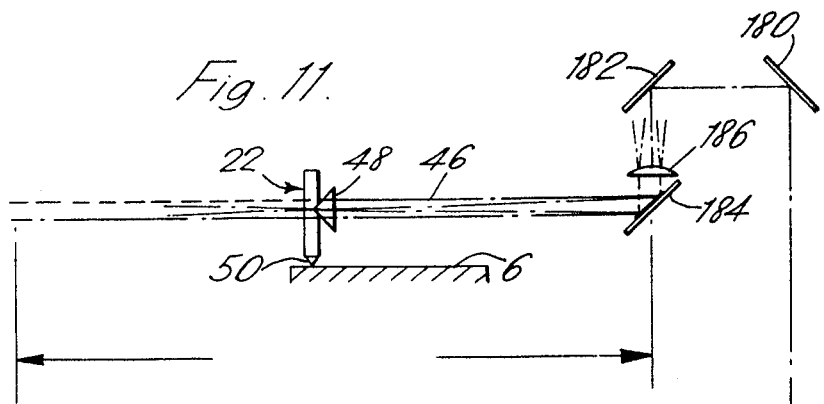
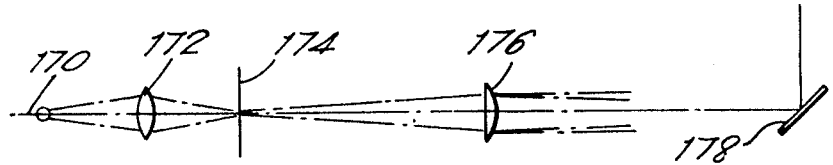

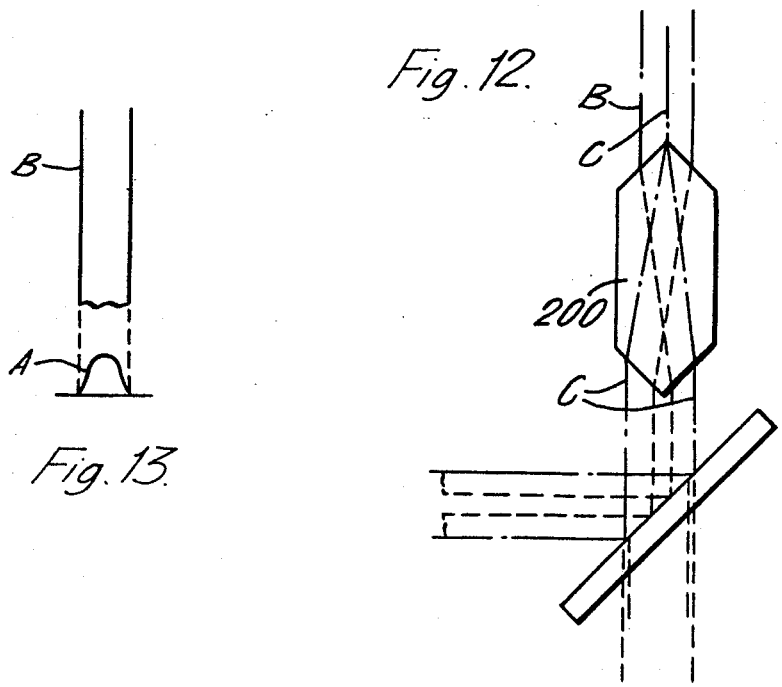
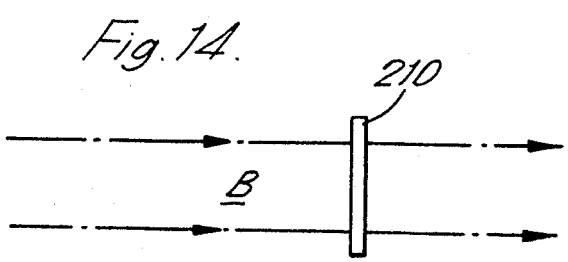

SURFACE MEASURING APPARATUS

This invention relates to apparatus for indicating the profile of a surface, for example the machined surface of a workpiece, and is particularly concerned with such apparatus capable of indicating the departure of this surface from straightness in any particular direction.

In such apparatus of known kind, a solid and nominally straight reference surface, from which any deviation of the surface profile is measured, is mounted above the surface under test, and with its plane lying in the desired direction. A sensor, arranged for traverse between the two surfaces, includes a skid arranged to engage the reference surface together with a stylus mounted for excursion relatively to and beneath the skid and arranged to engage the surface under test.

Traverse of the sensor along the surface under test produces an excursion of the stylus relatively to the skid, which relative movement is indicative of the deviation of the surface under test from the nominal straightness of the reference surface and can be translated into an electric output signal by any suitable means of known kind, for example electromagnetic or piezoelectric means. This electric signal is used in suitable apparatus to draw a trace representative of the deviation upon a recording chart.

As the dimensional tolerances of the machined surfaces of workpieces become smaller, it becomes increasingly more difficult to produce a reference surface having the necessary degree of straightness to enable accurate and meaningful measurement to be made, particularly where such measurements are required over an appreciable length of surface. In addition, the necessary positional relationship between the stylus and the skid makes it difficult to protect the reference surface and thereby, due to the presence of dirt or dust on this reference surface, to maintain its smoothness and the required accuracy of the measurement obtained.

According to one aspect of the present invention, an apparatus for indicating the profile of a surface for example the machined surface of a workpiece, comprises a source arranged to produce a light beam from which a reference light beam of substantially constant cross section is directed along and spaced apart from the surface, a sensor having a stylus effective to engage the surface and to traverse this surface along a line parallel to the path of the beam, beam displacement means coupled to the stylus and arranged to intercept the reference beam incident thereon and to displace the emergent beam as a measuring beam in response to excursions of the stylus along a path parallel to that of the incident beam, together with detection means effective to indicate any displacement changes between the incident and the displaced measuring beams and thereby to provide an indication of the surface profile.

By the use of the apparatus of the invention a reference surface is obtained which is weightless, which remains nominally straight irrespective of length and is relatively unaffected by dust or dirt. Also by measuring the relative displacement of the incident and measuring beams which are parallel to one another, the sensitivity of the profile measurement becomes substantially independent of the positions of the sensor along the workpiece. In addition, the parallel displacement of the emergent measuring beam is also independent of any residual angular tilting of the sensor, which is capable of producing only parallel displacement of the measuring beam.

Preferably the beam displacement means are arranged to produce no displacement of the incident beam as a result of rotation of the sensor about an axis mutually perpendicular to its line of excursion and its line of traverse. The beam displacement means may be a 90° prism of triangular section having its right-angled apex effectively coincident with the line of excursion of the sensor and having the corresponding base normal to the axis of and disposed to receive, the incident beam or may be a light-transmitting body having spherical surfaces and an index of refraction selected to receive the incident reference beam and return this beam along a path parallel to itself.

The means effective to direct the reference beam along a path parallel to the surface under test also are arranged to produce no deflection of the reference beam, as a result of movement of the directing means relatively to the workpiece.

Conveniently the detection means comprise a beam-splitting device arranged to receive the measuring beam and to produce from it two beams whose relative total flux is dependent upon the displacement of the measuring beam, and thereby of the sensor. Photoelectric devices suitably are arranged respectively to receive these beams emergent from the detection means so that an indication of the displacement between the reference and the measuring beams can be obtained from the electric outputs of the devices.

In a preferred embodiment focusing means are arranged to image the beam displacement means onto the sensitive areas of the devices and the devices, the focusing means, together with their associated components are arranged to move with the sensor so as to stabilize that sensitive area of each device which is activated.

Alternatively the detection means may comprise an optically opaque reflecting member of selected shape arranged to receive the beam from the source and reflect from it a reference beam of the selected shape onto the displacement means, and to intercept the returning measuring beam in such a manner that relative displacement of these beams produces further beams which emerge past opposite sides of the reflecting member, and have a relative total flux which is dependent upon the relative displacement between the reference and the measuring beams and thereby of the displacement of the sensor.

In the case where the workpiece is curved, movement of the sensor in response to the curved shape of the workpiece surface is compensated for by an optical deviator coupled to the stylus traverse and responsive to the mean arcuate movement of the sensor, the deviator being arranged to produce lateral displacement of the reference beam parallel to itself, so that it continuously remains incident upon the displacement means on the sensor and in the correct mean spacing from the surface under test. THe displacement of the measuring beam can be made a constant multiple of that of the sensor by a suitable arrangement of the beam displacement means on the sensor.

Embodiments of the invention will now be particularly described by way of example with reference to the accompanying drawings, in which FIG. 1. is a perspective view of an apparatus according to the invention.

Figure 2:
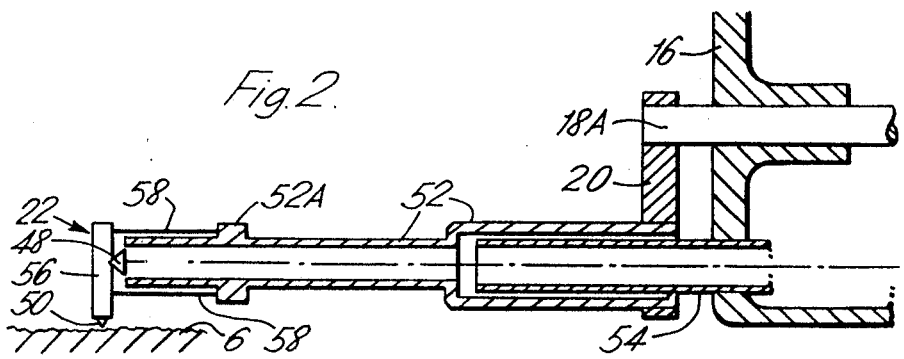

FIG. 2. is a sectional side view of a method of mounting a sensor forming part of the apparatus of FIG. 1.

Figure 3:
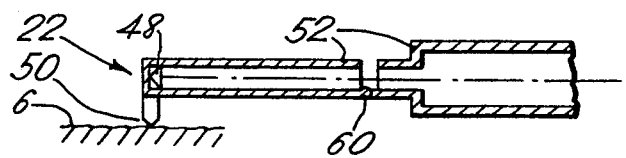

FIG. 3. is a sectional view of an alternative mounting to that shown in FIG. 2.

Figure 4:
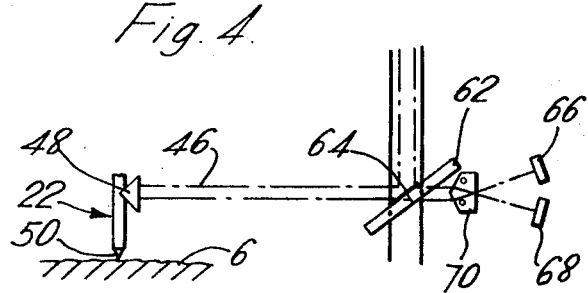

FIG. 4. is a schematic representation of an arrangement for measuring the displacement between beams produced in the apparatus of FIG. 1.

Figure 5:
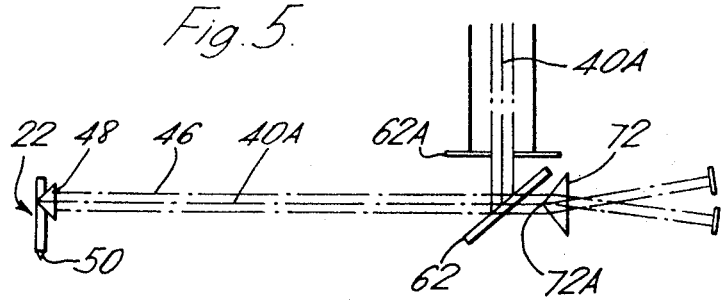

FIG. 5. is a schematic representation of an arrangement alternative to that of FIG. 4.

Figure 6:
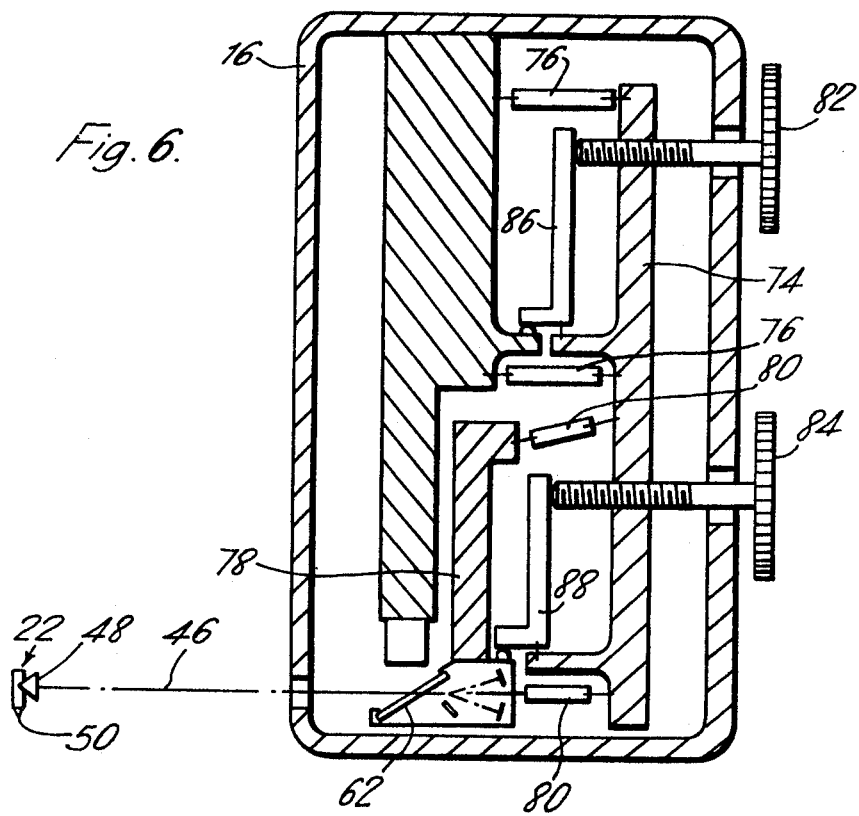

FIG. 6. is a sectional side view of an arrangement for producing the reference beam.

Figure 7:
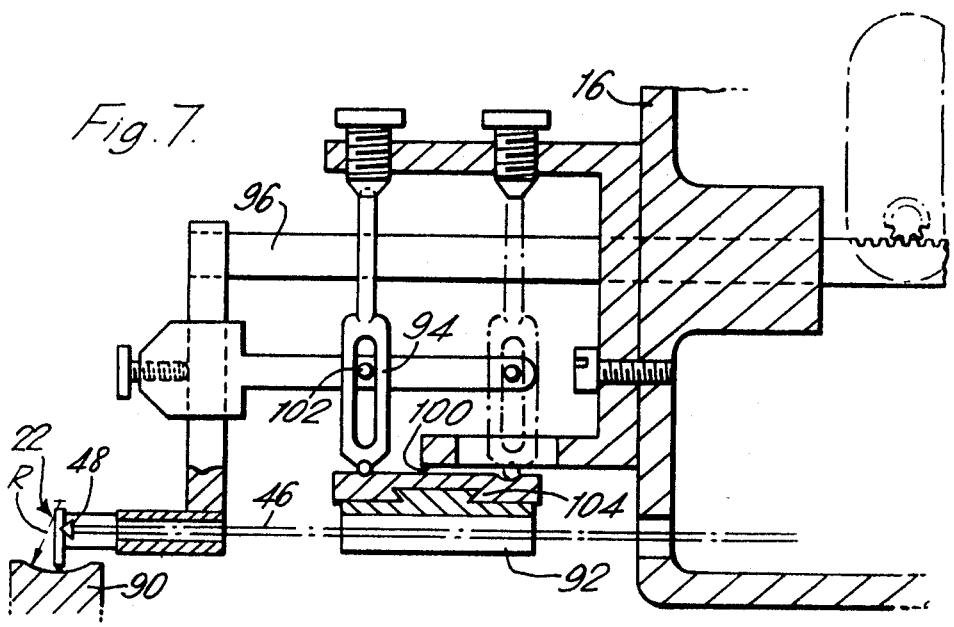

FIG. 7. is a sectional side view of an arrangement for measuring a curved surface.

FIG. 8. is a sectional side view of an arrangement for supporting photoelectric devices in the apparatus of FIG. 1.

FIG. 9. is an alternative arrangement of a part of FIG. 7.

Figure 10:
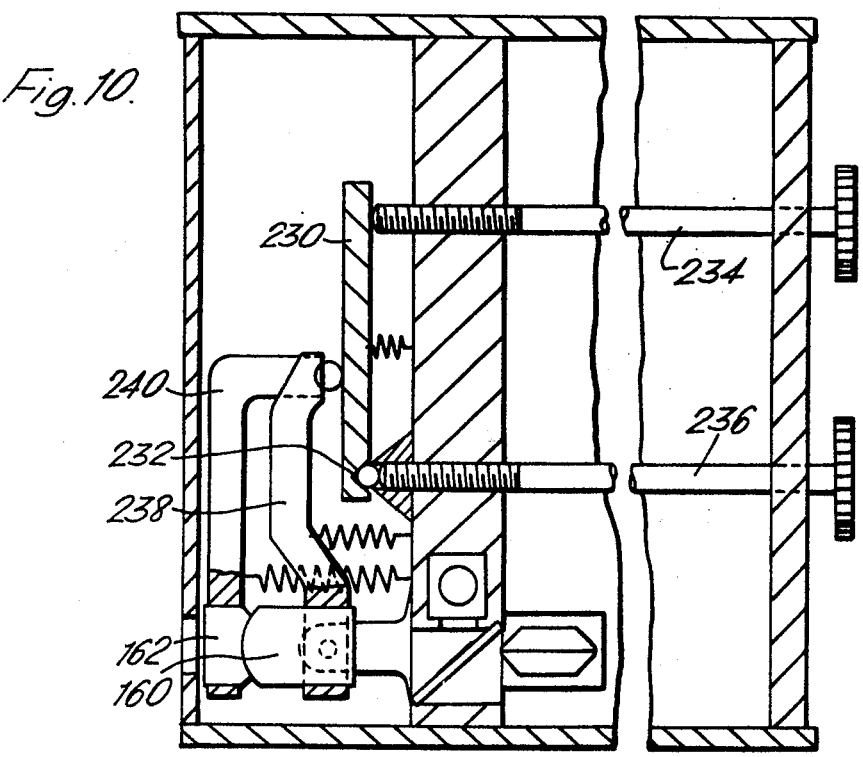
Figure 10A:
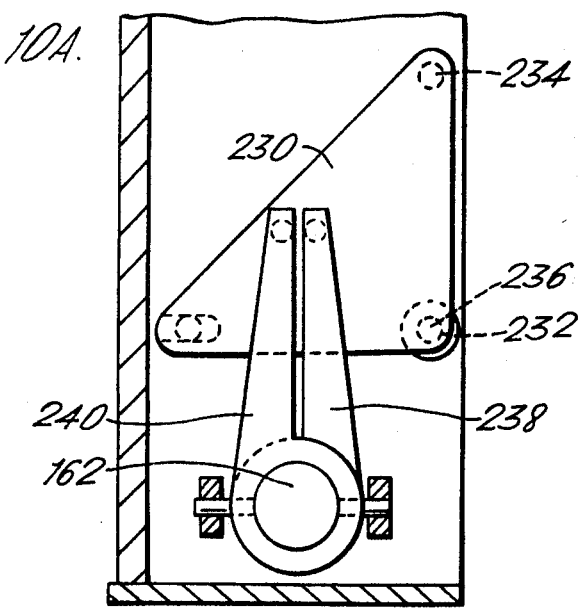

FIG. 10. is a sectional side view of apparatus including the parts of FIG. 9.

FIG. 11. is a schematic representation of a system for producing the reference beam used in the apparatus of FIG. 1.

FIG. 12. is a schematic representation of apparatus for producing a homogeneous reference beam.

FIG. 13. is a representation of intensity distribution in a light beam.

FIG. 14. shows a further method for producing beam homogeneity.

FIG. 15. shows a yet further method for producing beam homogeneity.

Referring to FIG. 1 of the drawing, the apparatus comprises a relatively massive bed 2 including an elongated channel 4 for accurately locating and retaining upon the bed 2, a workpiece 6 the surface profile of which is to be measured. In this embodiment the workpiece is shown as being cylindrical, and it is intended to measure the deviation from straightness of the sidewall 6A of the cylinder 6. However, the deviation from straightness of the surface, external or internal, of any type of workpiece may be determined by suitable mounting of the workpiece, and a suitable construction of the mounting for the surface responsive stylus.

Firmly secured to the bed 2, is a hollow vertical support pillar 8, which includes within its outer face 10, a vertical reentrant dovetail guideway 12, the inner surface of which connects with the central hollow of the pillar 8 by way of an elongated vertical slot 14, whose periphery is indicated by the dotted lines.

A hollow moveable platform 16 is supported for vertical movement on the pillar 8 by having a dovetail projection mating with the guideway 12, a suitable lead screw or the like (not shown) being arranged to move the platform to any suitable position on the pillar. The lead screw may be manually or motor driven.

A guide assembly, shown generally at 18, is supported for horizontal movement upon the platform 16 and carries at its free end a carriage 20 upon which is mounted a profile-responsive sensor indicated generally at 22. The sensor 22 is effective to traverse the surface of the workpiece 6 in order to assess the deviation of this surface from a nominal straight line represented by a light beam.

The traverse of the carriage 20 by horizontal movement of the guide 18 within and relatively to, the platform 16 is by means well known in the art and is not shown on the drawing. The guide for example may be manually operated, but in a preferred arrangement is motor driven, for example through a lead screw and gear assembly.

The reference beam of light from which the deviation from straightness of the workpiece surface 6A is assessed, is produced by the assembly 24 comprising for example an incandescent filament light source or a laser and optical components producing from this source, an emergent light beam of substantially homogeneous intensity and constant cross section.

The horizontal light beam emergent from the assembly 24 and indicated generally by the dotted lines 28, enters a hollow portion 30 of the base 2 by way of an aperture 32, and is deflected upwardly by a prism 34 into the hollow interior of the pillar 8 which communicates with the hollow in the base portion 30. Within the pillar 8, a further prism 38 supported by a flange 40 attached to the platform 16, further deflects the vertical beam into the hollow interior of the platform 16 by way of the slot 14, irrespective of the vertical position of the platform on the pillar.

Within the platform 16, two further prisms 42 and 44, (the latter being a cube with a cemented hypotenuse face), twice further deflect the beam 28 so that it emerges as a reference beam 46 from the platform through a suitable aperture and is directed to the sensor 22 along a line substantially parallel to but spaced apart from, the surface 6A of the workpiece 6. Suitable beam deflection means, later to be described may be provided with means for adjusting the inclination of this reference beam 46 which emerges from the platform 16, and which is used as a straight reference line from which any deviation from straightness of the surface 6A of the workpiece 6 is assessed. The reference beam is reduced to a selected cross section by a reflective strip 44A, the substantial homogeneity of intensity of the beam and the constancy of its cross section being produced by the arrangement and design of the optical components in the assembly 24.

It is highly desirable, once the inclination of the reference beam 46 with respect to the workpiece surface 6A has been accurately set, that the inclination of this beam remains absolutely constant irrespective of any movement of the deflecting prisms which are brought about by flexing or bending movements in the support pillar 8 at least in certain directions.

Assuming that the axis of the upwardly directional beam through the hollow pillar 8 remains at a constant angle to the base irrespective of any flexing of the column, this desideratum is achieved by the disposition of prisms 38, 42 and 44, each moving in synchronism with the column 8, which ensures that the reference beam 46 is unaffected by rotation of the platform 16 about the axis of the horizontal beam incident thereupon or by flexure of the column transversely of this horizontal beam axis. While the three reflections produced by the positional relationship of the three prisms 38, 42 and 44, produce the above-recited result, it will be appreciated that a greater number of reflecting surfaces suitably disposed to move in synchronism with the column, can be arranged to produce reflections producing the same result.

The reference beam 46 so produced, is arranged to be incident upon the base of a right-angled prism 48 forming a part of the sensor 22 and rigidly mounted above a stylus 50 adapted to engage the surface, under test, of the workpiece 6. The stylus 50, the prism 48 and the carriage 20 are hingeably mounted on the shaft 18 by way of a ligament hinge 21 and undergo vertical excursions corresponding to the profile of and normally to, the surface 6A when the sensor 22 traverses the workpiece 6.

Within the prism 48, the reference beam 46 is twice internally reflected and is thereby deviated by $\pi$ radians to reemerge from the base of the prism along a direction opposite but parallel to, that of the incident reference beam.

Accordingly as the prism 48 undergoes vertical excursions in response to the excursions of the stylus, the measuring beam emerging from the prism 48 will be displaced from the incident reference beam by an amount equal to twice the prism excursion, so that a continuous measurement of the displacement of these two parallel beams will be indicative of the surface profile. While a multiplication factor of 2 between the displacement of the sensor and that between the beams is obtained by prism 48, higher multiplication factors can be obtained by employing a larger even number of reflections of the reference beam at the sensor 22.

The right-angled apex of the prism 48 is positioned over the stylus so that substantially no displacement of the reference beam is produced by any small rotation about an axis mutually perpendicular to the line of traverse of the sensor 22 and the line of excursion of the stylus 50.

In an alternative mounting, the sensor 22 is hingeably mounted upon its support on the carriage 20A by two spaced-apart parallel ligaments. The use of such a hinge arrangement ensures that the excursion of the stylus 50 and thereby the prism 48 is substantially linear, permitting the stylus to extend some way below the reference beam 46.

Possible methods of hingeably mounting the sensor 22 are respectively shown in FIGS. 2 and 3.

Referring to FIG. 2, the carriage 20 on which the sensor 22 is mounted comprises a stepped moveable support tube 52 which is secured to a traversing bar 18 equivalent to the guide means 18 of FIG. 1 and effective to impart traversing movement to the tube 52. THe support tube has a clearance fit over a further tube 54 which enters the interior of the platform 16 and through which the reference beam and the deflected beam are led to and from the sensor through the support tube 52. The combination of tubes 52 and 54 serve to exclude dust and stray light.

The sensor, comprising the prism 48 and the stylus 50 both mounted on a stylus shaft 56, is supported on the end of tube 52 by two spaced-apart ligaments 58 secured between the shaft 56 and a flange 52A on the tube 52.

In the embodiment of FIG. 3, the sensor 22 is rigidly secured to the end of a first part of the support tube 52 which is itself hingeably mounted, by a single ligament 60 to a second part of the tube.

An arrangement for measuring the displacement between the reference beam 46 and the measuring beam displaced by the prism 48 is shown schematically in FIG. 4. In this arrangement, the reflective strip 44A of FIG. 1 is for convenience replaced by a light-transmitting plate 62 which is arranged to receive the light from the source 24 and to reflect this light onto the sensor 22 by way of the opaque reflecting strip 64 which is formed on the plate 62 and which defines the effective aperture of the reference beam 46 incident upon the prism 48 of the sensor. With the sensor in an equilibrium position, the beam reflected back or displaced by the prism 48 will be substantially coincident with the reference beam and will be substantially wholly intercepted by the strip 64.

When the prism 48 undergoes excursions from its equilibrium position representative of the surface profile of the workpiece 6, the measuring beam emerging from the prism 48 will be displaced from the reference beam 46, and beyond the sides of the mirror strip 64. Correspondingly increasing these will respectively pass beyond one side or the other of this mirror 64, and will thus provide an indication of the displacement between the reference beam 46 and the beam displaced by the prism 48.

The relative intensities of the beams projecting past the mirror 64, are conveniently compared by two photoelectric devices 66, 68 which receive the beams by way of a beam-separating device in the form of a biprism 70. The prism is effective to receive on adjacent faces the beams emerging past the mirror 64, and to increase the separation of these beams at the photocells by producing an inclination therebetween.

It will be appreciated, by reference to FIG. 5, that a separating prism of this kind can be used in conjunction with a semireflecting mirror to separate the reference and the displaced beam without the use of the opaque mirror 64. In this case, a biprism is arranged with an intersection 72A between adjacent faces at the mean line 40A of the reference beam, so that at equilibrium the light falling on the adjacent faces is of equal total flux. Upon displacement of the deflected measuring beam from the reference beam, the relative total fluxes in the beams emerging from the opposite end faces of the prism will be indicative of the displacement between the reference beam and displaced measuring beam. Photoelectric devices are again used to compare the relative total flux of these beams. In this case, since there is no opaque strip mirror to define the effective aperture of the reference beam, this must accordingly be defined before it reaches the mirror 62 by any suitable means of known kind, for example by the slit 62A.

For practical operation of the apparatus, vertical and tilt adjustments of the beams are required to bring them into alignment with the workpiece surface 6A. These adjustments may be provided by displacement of the workpiece, but are more conveniently provided by adjustment of the reference beam 46. An arrangement for providing such adjustment is shown in FIG. 6. For vertical adjustment, the mirror 62 of FIG. 4 is raised and lowered parallel to itself. For tilt, the mirror 62 is both raised and lowered and at the same time tilted so that the beam is rotated about the apex of the beam displacement prism 48 in a selected position, e.g. its midposition, so that in this position the tilt can be adjusted without affecting the vertical adjustment.

To effect these movements of the mirror 62 a platform 74 is carried for vertical movement on parallel ligaments 76 secured to the platform 16. The beam splitter mirror 62 is carried on a platform 78 supported on ligaments 80 secured to the platform 74; these ligaments converge to the center about which the mirror 72 must rotate, this center being in front of the prism 48 at a distance approximately equal to twice the distance of the prism from the mirror 62 in the selected (mid) position. Several versions of this idea are possible. Adjustment screws 82 and 84 are effective indirectly through pivoted levers 86, 88, to produce movement of the platforms 74 and 78.

To compensate for variations in offset sensitivity due to beam divergence, and for lack of perfect straightness of the axis of the beam, masks operated by cams linked with the traversing motion of the driving shaft may be provided to control the cross section of the reference beam 46.

The apparatus of the invention can also be used to measure the profile of surfaces having a cross section which is not straight but is curved. In this case, in order to effect measurement, each point on the reference beam 46 must retain the same mean spacing from the corresponding point on the surface of the curved workpiece. This criterion is achieved by deflecting the reference beam parallel to itself, in response to the movement of the sensor in response to the curved surface, so that at any particular point at which the stylus of the sensor engages the workpiece, the reference beam is at the correct mean distance from that point and is correctly and continuously incident upon substantially the same portion of the beam-reflecting prism 48 on the sensor 22. The reference beam thus follows a locus which is the nominally curved path of the workpiece as it is traversed by the sensor.

To enable the reference beam to follow the nominally curved path of the sensor, an optical deviator, cam or otherwise controlled from the traversing mechanism, may be inserted into the reference beam.

An arrangement for following an arcuate path of the sensor responsive to the profile of radius R of a workpiece 90 is shown in FIG. 7. A tilting glass block 92 is supported by a hinge 100 and is controlled for tilt about this point by a toggle linked to the shaft 96 driving the sensor 22. For the small traverse displacement of the stylus that generally occurs, this toggle mechanism will have the same displacement law as that of the curvature of the workpiece. If the velocity ratio of the midpoint of the toggle 94 to the driving shaft 96 is substantially unity (not quite possible with the construction shown) and the toggle are equal in length to the radius R of the workpiece, the required optical length of the deviator block 92 will for a refractive index $n=1.5$ of the plate 92 be 1.5 times the length between the hinge 100 and the point at which the block 92 is actuated by the toggle 94. If the toggle pin 102 is moved down, the linkage will track a workpiece of proportionally shorter radius. Longer radii can be catered for by inserting a shorter block 92 which for this purpose is carried in a detachable, for example a dovetail, mount 104. Toggle links of different radii can be used if required. For convex surfaces, the toggle is positioned to work on the opposite side of the hinge 100, as shown dotted, so as to reverse the sign of the tilt relative to the displacement.

It will be seen that parallel displacement of the toggle unit as a whole, such as might result from vibration, has no effect on the deviation when the arms are in their midposition, and that the driving shaft is not used to provide a reference surface.

In the case where photoelectric devices are used to detect and to measure the displacement between the reference beam 46 and the beam deflected by the prism 48 on the sensor 22, it is desirable, in order to maintain the accuracy of the apparatus, to ensure that the same sensitive area of the devices remains activated as the sensor traverses the workpiece, in order to avoid output variations produced solely by variations in the sensitivity of different regions of the sensitive area of each device.

To maintain such constant sensitivity of the photoelectric devices, a pupil of the system, for example the prism 48 on the sensor 22, is constantly imaged onto the sensitive areas of the devices for example by suitable lenses, and the devices, together with the lenses and any associated components, are coupled to the sensor so as to travel in synchronism therewith.

A practical arrangement in which the sensor prism is imaged on the photoelectric devices is shown in FIG. 8.

In this figure, a reflecting strip on the mirror 64 cooperates with the sensor prism 88 in manner aforesaid so that light returned from the prism emerges from one or the other side of the strip according to the direction of vertical displacement of the sensor. For convenience, these beams may be further separated by the pair of Dove's prisms 72 or indeed by a single prism. The two output beams emergent from the prism 72 are respectively focused upon the sensitive areas of the devices 66 and 68 by lens systems 110, and 112. The combination of the lens systems 110, and 112. The combination of the lens systems 110, 112, together with the photoelectric devices 66 and 68, are mounted upon a carriage 114 which is coupled to move with the guide bar 18 effecting traverse of the sensor 22.

A plate 126 having an upturned arm 130 controlling the horizontal width of the beams returned from the sensor rests on a ball 132 and feet 134 and 136 against which it is held by a spring not shown. THe plate 126 can be rotated around a vertical axis through the ball 132 by a cam slot 138 through which passes the key pin 140. Thus the width of the beam can be altered to compensate for its divergence. In addition to rotation about a vertical axis, the plate can be tilted about a horizontal axis through 132 and 134 by an adjustably inclined cam surface 137 on which rests the foot 136. In this way the rate of control of one beam can be made greater than that of the other to provide a form of straightness correction.

The arrangement shown in FIG. 8 has the advantage of higher stability than that of 6, it also shows adjusting knobs 150 and 152 that are carried on the frame 120 and that will therefore not be too sensitive to the touch. They could be motor driven. There will be a little cross coupling, between the knobs partly because of the arcuate movement of the ends of the coupling rods 154 and 156, but it should not be enough to matter.

An arrangement for operating the blocks 160 and 162 is shown in FIG. 10. In this arrangement a swashplate 230 is arranged to pivot about the point 232 and to move about this pivot point by means of actuating screws 234 and 236.

Blocks 160 and 162 respectively are connected to arms 238 and 240 which resiliently abut the swashplate 230 at different distances, in a horizontal plane, from the vertical axis including the pivot point 232.

Accordingly, operation of the setscrew 234 will cause the swashplate to tilt about the horizontal axis including the pivot point 232, so that the two arms 238 and 240 will move by equal amounts. The blocks 160 and 162 will accordingly tilt through equal angles. However, upon adjustment of the setscrew 236 the swashplate 230 will pivot about the vertical axis including the pivot point 232 so that the arm 238 will move through a greater angle than the arm 240, being supported from this vertical axis by a greater distance.

Accordingly the blocks 160 and 162 will tilt by different amounts.

Instead of operating on the mirror 62 for height and tilt adjustment, it is possible to use optical deviators situated in the reference beam. For example one could use a pair of oppositely rotating wedges for tilt, coupled through a sine-law device with a tilting parallel plate, for tilting the reference beam through or over the stylus at some point in its traverse. The rotating wedges could themselves be tilted to provide the parallel displacement of the reference beam in the case where the apparatus is used to assess a curved surface.

An alternative arrangement for producing displacement and tilt of the reference beam is shown in FIG. 9. In this arrangement two blocks of glass 160 and 162 having a cylindrical or spherical interface are mounted for inclination relative to each other and to the frame, so as to form a tilting deviator of variable angle.

In the case where parallel displacement only of the reference beam is required in the deviator of FIG. 9, the blocks 160 and 162 are rotated through equal angles by any suitable means, to produce such displacement. However, by rotating block 160 for example through greater angle than that of block 162 the reference beam will also be tilted, so that the deviator arrangement of FIG. 9 can be used to vary the inclination of the reference beam as well as providing parallel displacement thereof.

The arrangement for providing a reference beam from an incandescent filament source is shown schematically in FIG. 11.

Referring to FIG. 10 the arrangement comprises a source 170, a condensing lens 172, a slit 174 and a collimating lens 176. The collimating lens 176 produces a beam of small cross-sectional area and extremely low divergence for use as a reference beam. To complete the example, mirrors 178, 180, 182 and 184 are used as a means of deflecting the beam from the source 170 on to the prism 48 of the sensor 22 of FIG. 1. The elements 170, 172, 174 and 176 may form the unit 24 in FIG. 1.

Instead of letting the displacement prism 48 operate directly in the beam emerging from the collimating lens 176 a further lens 186 may be inserted in the beam from the source 170 in order to form an image of the slit 174 on the mirror 184 (or 64 in FIG. 1) when the prism 48 is in a predetermined position, for example at the extreme forward end of the sensor traverse, the width of the slit 174 being made such that its image is then of the same size as the width of the strip mirror 184.

Considering the image on the slit formed by the lens 186 it will be seen that except for diffraction effects all possible rays between the mirror 184 and the plane at the extreme end of the traverse of sensor 22 must be contained within a parallel tube terminated by mirror 184 and this end-of-traverse plane and produce a beam having extremely small effective divergence and substantial straightness which is particularly suitable for use as a reference beam.

In order that the insertion of the lens 186 should not impair the independence of tilt inherent in the system of FIG. 1, the rear nodal plane of lens 186 should coincide with the center of the mirror 184. This can be effected by making the lens 186 in the form of a thick meniscus which may conveniently be achromatized.

As an alternative to an incandescent filament source, a laser source can be used. This itself produces a beam of small and substantially constant cross section, so that the collimating system of FIG. 11 can be dispensed with.

The disadvantage of a laser source is that the beam obtained therefrom is generally not of homogeneous intensity being greatest at the center of the beam, so that means for homogenizing the beam are preferably included if such a laser source is used. FIG. 13 shows, in curve A, the distribution of intensity across the diameter of a beam B from a laser. It will be seen that the intensity is greatest at the center of the beam and falls off sharply towards the edges of the beam.

A system for homogenizing the beam from such a laser source is shown in FIG. 12. In this system the beam B is incident upon a prism 200 which refracts the center portion C of the beam in such a manner that it occupies the periphery of the emergent beam, the periphery of the incident beam now occupying substantially the center of the emergent beam. This "inversion" of the beam produces considerable homogenization.

An alternative system for homogenizing the output beam from a laser is shown in FIG. 14. In this system the beam B is passed through a plate of light-transmitting material having its light-transmitting characteristics arranged so that maximum attenuation occurs at the point of maximum beam intensity, so that the light output from the plate is of homogeneous intensity. In the embodiment shown, a photographic plate 210 is exposed to the beam B from the laser and is developed and/or printed to such a density gradient as will compensate for the gradual reduction of the intensity of the beam B from its center. The plate 210 or a copy of it is then mounted in the beam to effect such compensation.

In the embodiment shown in FIG. 15 homogenizing of the laser beam is effected by selective radial compression thereof. In this embodiment the combination of optical elements 220 and 222 selectively reduce the areas of successive annular portions of the beam extending from the center thereof in such a manner that the total flux in the outer zones becomes increased to compensate for the originally greater flux in the central circular zone, so that the intensity of the beam emerging from the elements 220 and 222 becomes homogeneous. Both the elements 220 and 222 will generally be aspheric. For convenience the beam B may first be expanded to a convenient diameter by a telescope then corrected for flux distribution as shown and then reduced in diameter by a further telescope.

I claim:

1. Apparatus for indicating the profile of a surface, for example the machined surface of a workpiece, comprising in combination:

a source arranged to produce a light beam, means producing a reference beam of substantially constant cross section from said light beam, means directing said reference beam along and spaced apart from said surface, sensor means having a stylus effective to engage said surface, means traversing said stylus over said surface along a line substantially parallel to the path of said reference beam, beam displacement means coupled to said stylus, arranged in said path of said reference beam and effective to displace said reference beam in a predetermined direction as a measuring beam in response to excursions of said stylus in a direction perpendicular to the direction of said reference beam, said beam displacement means maintaining said measuring beam parallel to said predetermined direction irrespective of rotation of said beam displacement means about an axis mutually perpendicular to said beam and the line of excursion of said stylus, detection means effective to indicate any displacement change between said reference beam and said measuring beam and thereby to provide an indication of said surface profile.

2. The apparatus of claim 1 wherein said beam displacement means displaces said measuring beam in predetermined direction which is parallel to but opposite the direction of said reference beam.

3. The apparatus of claim 2 wherein said beam deflection means deflects said measuring beam in said predetermined direction opposite said direction of said reference beam by an even number of reflections.

4. The apparatus of claim 1 wherein the means directing the reference beam along a path parallel to the surface under test produces zero deflection of the reference beam as a result of movement of the directing means relatively to the workpiece.

5. The apparatus of claim 1 wherein said beam displacement means comprise a 90° prism of triangular section lying perpendicular to and intersecting the line of excursion of the stylus and having the corresponding base opposite the right-angled apex normal to the axis of and disposed to receive the incident reference beam.

6. The apparatus of claim 1 wherein the beam displacement means comprise a light-transmitting body having spherical surfaces and an index of refraction selected to receive the incident reference beam and return this beam along a path parallel to itself.

7. The apparatus of claim 1 wherein the detection means comprise a beam-splitting device arranged to receive the measuring beam and producing from it two beams whose relative flux are dependent upon the displacement of the measuring beam, and thereby of the stylus.

8. The apparatus of claim 1 wherein the detection means comprise an optically opaque reflecting member shaped to receive the beam from the source and reflecting from it a reference beam of the selected shape onto the displacement means, and intercepting the returning measuring beam such that relative displacement of these beams produces further beams emerging past opposite sides of the reflecting member, the relative flux of said further beams depending upon the relative displacement between the reference and the measuring beams and thereby of the displacement of the stylus.

9. The apparatus of claim 7 including means, such as a Dove prism, arranged to increase the displacement between the beams emergent from the detection means.

10. The apparatus of claim 7 including photoelectric devices arranged respectively to receive the beams emergent from the detection means and means providing an indication of the displacement between the reference and the measuring beams from the electric outputs of the devices.

11. The apparatus of claim 10, wherein focusing means are arranged to image the beam displacement means onto the sensitive areas of the said photoelectric devices and said photoelectric devices, together with the focusing means, are arranged to move with the sensor so as to stabilize that sensitive area of each device which is activated.

12. The apparatus of claim 1 wherein beam inclination adjusting means are arranged in the path of the incident reference beam and are effective to adjust the line of path thereof independently of the line of traverse of the sensor.

13. The apparatus of claim 1 including a support tube upon which the sensor is mounted, said tube being effective along its length to enclose the beams incident upon and displaced by the displacement means to assist to protect the beams from stray illumination.

14. The apparatus of claim 13, wherein the sensor is rigidly secured to one end of the support tube, and a hinge mounting is attached to the other end of the support tube.

15. The apparatus of claim 13, wherein the sensor has a hinge mounting disposed immediately adjacent an end of the support tube, the other end of the tube being rigidly mounted.

16. The apparatus of claim 16 including a guide tube within which the support tube is arranged to slide, the guide tube being effective to form an extended further enclosure for the incident and deflected beams so as to further protect them from stray illumination.

17. The apparatus of claim 16 wherein the hinge mounting comprises spaced-apart parallel ligaments effective to produce substantially linear excursion of the stylus normally of the surface under test.

18. The apparatus of claim 1 including an optical deviator effective to compensate for curved movement of the sensor in response to the curved shape of the workpiece surface, the said deviator being coupled to the stylus traverse and responsive to the mean arcuate movement of the sensor, and the deviator being arranged to produce lateral displacement of the reference beam parallel to itself, so that it continuously remains incident upon the displacement means on the sensor and in the correct means spacing from the surface under test.

19. The apparatus of claim 18, wherein the deviator comprises a light-transmitting block having parallel opposite faces and arranged for transmission of the beam between said parallel opposite faces and effective when tilted in response to the sensor traverse to produce refractive displacement of the beam.

20. The apparatus of claim 19, including a tilting mechanism connected to said block and adjustable to enable the rate of tilting to be varied according to the curvature of the workpiece surface.

21. The apparatus of claim 1 including means effective to maintain a constant effective aperture of the reference beam along its length to compensate for any divergence of the beam.

22. The apparatus of claim 1 wherein the light source is an incandescent source.

23. The apparatus of claim 1 wherein the light source is a laser source.